Patented Feb. 25, 1941

2,233,344

UNITED STATES PATENT OFFICE 2,233,344

MANUFACTURE OF PIGMENT-COLORED EXTRUSION PRODUCTS

Emerson B. Helm, Cleveland, and Robert D. MacLaurin and John B. McKelvey, Lakewood, Ohio, assignors to Industrial Rayon Corporation, Cleveland, Ohio, a corporation of Delaware No Drawing. Application January 18, 1937, Serial No. 121,170

10 Claims. (Cl. 18—54)

This invention relates broadly to the manufacture of pigment-colored extrusion products such, for example, as blocks, sheets, films, ribbons, threads, filaments, etc., usually but not necessarily of a kind produced by projecting into a suitable coagulant an aqueous solution, suspension or other dispersion of a derivative of cellulose. More particularly, it relates to the manufacture of extrusion products which contain and are colored by means of finely divided pigments. The invention is especially concerned with and will be described as applied to the production of black artificial silk thread by the incorporation in the mass from which the thread is formed of relatively large percentages of carbon black pigment, together with a material for maintaining the dispersion of the pigment. Although the examples hereinafter given have reference to the viscose process, it should be understood that in certain of its aspects the invention is equally applicable to the cuprammonium, nitrocellulose and cellulose acetate processes.

The earlier processes for making artificial silk thread produced a thread with a brilliant, metallic luster, whether in its original white condition or dyed. For this reason, various procedures were developed which sought to reduce the normal luster by the addition to the mass of appropriate quantities of one or more of a wide variety of substances, usually a pigment, an emulsified oil or both. The substance now most generally used for delustering is titanium dioxide, but there have been suggested various other pigments such as zinc oxide, lithopone, barium sulphate and magnesium oxide. It is to be observed that the pigments thus suggested for delustering are substantially colorless; accordingly, while they change the luster of the product, they do not modify its color.

By contrast, the present invention provides a pigment-colored product in which the pigment is used primarily for the purpose of and in quantities producing a full, strong, permanent color.

In the case of viscose artificial silk thread colored by means of carbon black, it is necessary, in order to produce a thread which is fully black, to add to the viscose an amount of carbon black not substantially less than 2% of the amount of cellulose in the viscose. A quantity of carbon black substantially less than 2% tends to produce a thread which is merely gray or slate-colored. For a good jet black, about 4½% of carbon black is needed in the finished thread. However, the incorporation of carbon black in the quantities required to give such a color is extremely difficult because of the fact that the carbon black particles have a hydrocarbon film surrounding them which not only prevents the wetting of the particles of carbon black by water but also causes the individual particles to adhere and agglomerate into relatively large masses.

It has not heretofore been found possible to incorporate in viscose any such quantities of carbon black, either as such or in the form of a suspension. If substantial amounts of carbon black are added to the viscose, particularly if there is present an oil of the kind and in the quantities used for delustering, the carbon black immediately agglomerates into particles too large to pass through the pores of the filters. No matter how fine its original particle size, when the carbon black is added to the viscose, the particle size at once increases, particularly in the presence of mineral oil. If an attempt is made to spin such a mass, the spinnerets clog practically at once. No useful quantity of thread can be obtained, since the quantity of thread which can be spun before clogging occurs is only a relatively small amount. Attempts to employ substances such as castor oil, dibutyl phthalate and tricresyl phosphate result in no significant improvement.

The mere omission of the oil fails to produce satisfactory results; further, even such suspensions as can be prepared by milling dry carbon black in water settle far too rapidly to permit of their incorporation in viscose.

If the carbon black, whether suspended in water, oil or dilute caustic solution, is added to the viscose before the filtering operation, the agglomerates of carbon black particles clog the filters in a relatively very short time, removing most of the carbon black. Even such viscose as passes the filters is not spinnable, apparently because the carbon black particles continue to agglometate after passing through the filters. Similarly, if a carbon black suspension in oil, water or dilute caustic is first filtered separately, not only is the filtering operation difficult, but the same agglomeration occurs after the particles are added to the viscose. The viscose in such case clogs the spinnerets, thereby preventing the spinning of more than a few yards of thread between cleanings of the spinnerets.

It has now been found possible, by the use of a water-soluble dispersing agent, to cause the carbon black to take such a form as to permit of the production of a water paste of carbon black containing 25% or more of carbon black. Such a paste can be milled to produce the necessary fine particle size and maintain the article size after the milling without settling out or agglomerating. Thus the material may be incorporated in the viscose in the desired quantity. The invention thus provides means for conditioning the carbon black to make possible the continuous spinning of thread which includes sufficient carbon black to produce a fully black thread.

The invention resides in part in a new composition of matter including a viscose mass of normal spinning strength, a substantial percentage of carbon black as a colorant, and a smaller percentage of a dispersing agent which is uninjured by and chemically non-reactive with the viscose, which is effective in the viscose to maintain the maximum degree of dispersion of the carbon black, and which is free from physical effects upon the viscose of such character as to impair the filterability or spinnability of the composition. The invention thus utilizes a viscose mass which is normal as to strength, ageing properties and other characteristics. It provides a means of introducing in the form of particles too small to clog the spinning jets a quantity of carbon black sufficient to produce a fully black thread.

It is desirable that the dispersing agent be capable of not only maintaining the necessary finely dispersed condition of the carbon black particles, but also of causing the oily particles of carbon black to be wet by the water in which they are suspended. It is desirable that the dispersing agent employed be stable in dilute alkali solutions of the character used to dissolve the cellulose xanthate to form viscose. It is further desirable that the dispersing agent be without effect upon the viscose, particularly upon its viscosity, since otherwise it may be impossible to filter, pump or spin the viscose. It is also desirable that the dispersing agent be of relatively high dispersing power, since the carbon black particles must be maintained at the maximum fineness of particle size and in the greatest possible degree of dispersion.

The best dispersing agent for the carbon black so far found is a water solution of guaiacum. A water solution of sodium caseinate is, however, satisfactory. The substance known as Gardinol, a mixture of the sodium salts of sulphonated lauryl alcohol and its homologues, is also satisfactory. Sodium cresylate is likewise effective. Sulphonated mineral oil in a vehicle of unsulphonated mineral oil ("Twitchell oil") type shown in Patent No. 1,909,721 may be employed, if desired. It will be observed that all of these substances are water soluble, are powerful wetting-out agents with a strong effect upon the surface tension at the interface between the carbon black and the water, and are powerful dispersing agents. In addition to being chemically inert with respect to the viscose, they do not increase its viscosity.

The "Twitchell oil" above mentioned is a product consisting of a clear light-colored saturated petroleum oil in which there is dissolved a substantial percentage, which may be from 15 to 25%, of certain water-soluble sulphonated hydrocarbon oils. These sulphonated oils are derived from the unsaturated constituents of ordinary hydrocarbon oil by a treatment of the oil with fuming sulphuric acid, that is, acid containing an excess of sulphur trioxide, or, conveniently, a treatment with "oleum." Among other things, the sulphonated products are powerful emulsifying agents which serve to produce from the mixture of them with the ordinary hydrocarbons a preparation that emulsifies readily in water solution.

These water-soluble sulphonated oils are not ordinarily obtainable in pure form apart from the non-sulphonated hydrocarbon oil, but if obtainable could be used in such form.

As noted, the sulphonated portion of "Twitchell oil" is a good emulsifying agent, but in addition it satisfies the requirements of the invention in that it is water-soluble, a powerful wetting-out agent and an excellent dispersing agent. The presence of the unsulphonated oil is not harmful, because the powerful emulsifying properties of the sulphonated oil portion prevent interference by the unsulphonated oil with the dispersion of the carbon black; that is, the sulphonated portion is a sufficiently powerful dispersing agent to maintain the carbon black particles in dispersed condition and also maintain the hydrocarbon oil in emulsified condition without interference between the two. The quantity of the "Twitchell oil" required is small compared to the quantity of oil required for delustering purposes, but the hydrocarbon oil of the mixture is effective to produce a perceptible amount of delustering in the finished yarn.

In practicing the invention, the carbon black, which may be either lamp black or gas black, is prepared by milling it in water containing a small amount of the desired water-soluble dispersing agent, preferably guaiacum. It is desirable that the milling be very thorough, to reduce the particles to the desired minimum size and to obtain as good a dispersion of the particles in water as possible. The resulting product is a water paste containing preferably approximately 25% of carbon black. This product may be diluted with oil or water and filtered or centrifuged to remove the large particles, leaving in the suspension only particles sufficiently small to pass readily through the orifices in the spinnerets. An alternative procedure is to incorporate the filtered mixture of carbon black, water and the dispersing agent in a convenient small quantity of viscose. For this purpose, a volume of viscose from one to four or five times as great as the filtered mixture may be taken and the mixture stirred into it by a power-driven high speed stirring device. In either case, the resulting mixture may be incorporated in the viscose while the latter is still in bulk condition.

If desired, the carbon black may be made up into a similar 25% paste in water with a small percentage of sodium caseinate. Similarly, the carbon black may be made up into a paste in water with the admixture of the above-mentioned hydrocarbon and sulphonated hydrocarbon oils ("Twitchell oil"). These alternative procedures similarly each require a milling operation on the carbon black in the water paste to reduce the particle size. In some ways, the preparation with the oil mixture may be regarded as preferable because of the inclusion of the oil in the finished thread.

Another suitable composition includes, along with the carbon black, both guaiacum or sodium caseinate and the "Twitchell oil." It has been found that while the dispersing properties of the "Twitchell oil" with regard to the carbon black are satisfactory, the combined dispersing properties of the guaiacum or sodium caseinate and "Twitchell oil" are markedly superior: the resulting mixture is more fluid, filtering more readily, and the presence of the oil in the finished thread is advantageous. In preparing this composition, the carbon black and guaiacum or sodium caseinate may be milled in water to reduce the particle size. This milling may be sufficient to bring the particle size down to the required minimum or it may be only part of the total milling. Then the "Twitchell oil" may be added to the milled mixture and incorporated by vigorous stirring. Thereafter, if the particle size is not already small enough, the milling may be continued. As before, this mixture may, if desired, be added directly to the bulk of the spinning mass.

Whatever the character of the composition so made up, it is desirable that the carbon black suspension be passed through one or more filters before it is added to the viscose, preferably filters having substantially the same characteristics as the viscose filters themselves. All of the above compositions have the advantage that, inasmuch as none yields the jelly-like masses characteristic of many dispersing agents, the carbon black suspension may readily be filtered in this manner. Where the carbon black suspension is preliminarily incorporated in a portion of the viscose, it is usually advantageous to filter not only the suspension but the incorporation mixture as well.

The viscose is prepared and aged in the customary way, preferably with the omission of some of the water used in dissolving the cellulose xanthate in caustic soda solution to permit replacement of this water by the water in the carbon black suspension, as described in the copending application of Hayden B. Kline identified as application Serial No. 153,379, filed July 13, 1937, as a continuation in part of application Serial No. 4,693, filed February 2, 1935. It is preferable to add the carbon black suspension to the viscose toward the close of the ageing schedule. When it is to be included in viscose which has been aged for a period of 72 hours, the viscose after 60 hours ageing may be sent in a batch of the desired size to the mixer, the proper quantity of carbon black suspension being then added and stirred in over a period of several hours.

A convenient procedure is to discharge the viscose into a tank or mixer into which the carbon black suspension may then be introduced. It is desirable that the incorporation be as thorough as possible in order to avoid streakiness in the finished product. The preliminary filtering of the carbon black suspension is in some instances sufficient, especially if the filter pores are somewhat smaller than the usual viscose filter. A preferable procedure, however, is to filter the viscose shortly after the carbon black suspension has been incorporated therein. Thereafter the viscose may be sent to the tank or tanks from which it is delivered as needed to the spinning machines.

Whereas with uncolored viscose, quantities as great as 75,000 pounds can be spun between changes of the filtering medium in the last filter through which the viscose is passed before being sent to the spinning tanks, in the case of viscose containing 3 to 4½% of carbon black based on the cellulose content it is necessary to mill the carbon black to a particle size which will permit of the filtering of only about 4,500 pounds of viscose before a change of filtering medium is required. If the milling is carried too far, a yarn having a brownish undertone will be produced; whereas if the milling of the carbon black is not carried far enough, so many large particles of carbon black are left in the paste as to clog the filters in an undesirably short time. Accordingly, it is necessary to continue the milling to an optimum point where a reasonable quantity of spinning solution, such as the 4,500 pounds above mentioned, can be put through the filter between changes of the filter medium.

In the preparation of the spinning mass, the preferred composition is as follows:

| | Pounds |
|---|---|
| Viscose (6½–7% cellulose) | 1500 |
| Carbon black | 4½ |
| Guaiacum | 0.225 |
| Water | 13½ |

Alternatively, the following composition, employing sodium caseinate in lieu of guaiacum, gives satisfactory results:

| | Pounds |
|---|---|
| Viscose (6½–7% cellulose) | 1500 |
| Carbon black | 4½ |
| Sodium caseinate | 0.3 |
| Water | 13½ |

In both instances, the carbon black, dispersing agent and water are preferably introduced simultaneously in the manner above described.

Still another form which the invention may take utilizes the above-described sulphonated mineral oil, as follows:

| | Pounds |
|---|---|
| Viscose (6½–7% cellulose) | 1500 |
| Mineral oil | 1.2 |
| Sulphonated mineral oil ("Twitchell oil") | 0.3 |
| Carbon black | 4½ |
| Water | 13½ |

Both "Twitchell oil" and guaiacum may be employed, in which case the following composition may be used:

| | Pounds |
|---|---|
| Viscose (6½–7% cellulose) | 1500 |
| Carbon black | 4½ |
| Guaiacum | 0.225 |
| Mineral oil | 1.2 |
| Sulphonated mineral oil ("Twitchell oil") | 0.3 |
| Water | 13½ |

The above compositions yield a brilliant black thread of a fairly high luster. If a black thread of lower luster is desired, the usual titanium dioxide delusterant may be incorporated, using a composition as follows:

| | Pounds |
|---|---|
| Viscose (6½–7% cellulose) | 1500 |
| Titanium dioxide | 1 |
| Delustering oil | 2 |
| Carbon black | 4½ |
| Guaiacum | 0.225 |
| Water | 13½ |

A considerable control of the luster of the thread may be obtained by the choice of the particular carbon black pigment which is utilized. If the very fine grades of gas black are used, the material may have a luster nearly as great as undelustered uncolored thread, although any carbon black pigment has some delustering effect. If the carbon black used is a lamp black or colloidal graphite, there is obtained a decidedly more slate-like black with a lower luster. The addition of titanium dioxide, which is a white pigment, does not produce as great a delustering effect on black thread as it does upon white thread, but a valuable delustering effect is nevertheless obtainable by adding titanium dioxide.

Thread spun from the foregoing compositions has a color which is slightly on the warm side;

i. e., black with a hardly perceptible tinge of brown. This is especially true if the quantity of pigment is the minimum required or if it is unusually well milled. If it is desired to produce a cold black or a blue-black color, any of the convenient deep blue or blue-black dyes may be added to the above compositions as an adjuvant for the carbon black, such, for instance, as Poncol RP Blue, Direct Black BH, Sulphogene Fast Black CL and Indanthrene Blue RK. The addition of dyestuff is made before spinning, preferably at the time the carbon black suspension is added.

The carbon black shows strong adsorptive properties for these dyestuffs and accordingly a considerable quantity of dye is necessary before any perceptible effect is obtained. That is, not only must enough dye be added to saturate the adsorptive requirements of the carbon black, but enough more must be introduced to give the required color, which additional amount usually is that required to give a deep shade on the ordinary thread uncolored by carbon black. To obtain the desired blue-black color, the amount of dye required may be nearly equal in weight to the amount of carbon black added.

The invention is applicable to other pigments then carbon black; for example, rouge, orpiment, ochre, chrome green, chrome yellow, etc. It is to be noted that all of these substances are stable in alkaline solution as distinguished, for example, from pigments such as Prussian blue. These substances are somewhat less resistant to the wetting out operation and to subsequent dispersion than carbon black, since they do not have the hydrocarbon film on the particles; however, all are more or less water repellent and require the presence of a dispersing agent of the kind described in order to bring them into a suitable dispersion for inclusion in the alkaline solutions employed in the viscose and cuprammonium processes.

The invention may advantageously be practiced with such other pigments by the incorporation in the solution of the desired pigment together with an appropriate dispersing agent. As in the embodiments above described, the pigment may be made up in the form of a water suspension by milling it in water with the dispersing agent to reduce the particle size and perfect the dispersion. The presence of the dispersing agent promotes rapid, uniform incorporation of the pigment and prevents the settling out of the pigment particles, especially when incorporated in viscose. This procedure is particularly advantageous in the case of rouge, chrome colors and other pigments which have surface tension characteristics approaching those of carbon black.

The invention also applies to the various lakes, which are color pigments made by precipitating and adsorbing dyestuffs upon a suitable pigment, usually an aluminum oxide substance. Because of its wetting effect upon the lake, the dispersing agent enables the cellulosic material to adhere thereto somewhat better than it does to similar untreated pigment. In these instances, as in those above mentioned, the dispersing agent promotes uniformity of the mixture. The resulting thread is therefore highly uniform in color.

The invention is applicable not only to thread or the like, but to ribbons, films, sheets and blocks, especially when made by the viscose process. Such products are uniform in pigmentation, free from streaks, spots, striae, etc., and smooth upon both surfaces in a manner previously unobtainable. This absence of streaks, spots and striae is due to the uniformity of distribution of the pigment. Similarly, the smoothness of surface texture is due to the absence of agglomerations which sometimes tend to occur, as in the case of carbon black.

It is to be noted that as the character of the mass and/or the pigment is changed, the range of available dispersing agents increases, wherefore the invention is not to be understood to be restricted to the above-mentioned dispersing agents. While there are above described but a limited number of embodiments of the invention, it is possible to produce numerous other embodiments without departing in any way from the inventive concept. It is desired that only such limitations shall be imposed upon the appended claims as are stated therein or required by the prior art. It is intended that the patent shall cover, by suitable expression in the appended claims, whatever features of patentable novelty reside in the invention.

What is claimed is:

1. A method of manufacturing multiple filament viscose artificial silk thread containing a water-repellent pigment colorant in an amount not substantially less than 2% based on the cellulose content of the viscose comprising the steps of preliminarily milling said water-repellent pigment colorant in water in the presence of a water-soluble dispersing agent to form a paste containing approximately one part of said water-repellent pigment colorant to three parts of water; incorporating said water-repellent pigment colorant in the viscose from which the thread is to be formed; and extruding the viscose into a coagulating bath to form a multiple filament artificial silk thread characterized even in the absence of color-intensifying compounds by an intense color.

2. The method of manufacturing multiple filament viscose artificial silk thread recited in claim 1 in which said water-repellent pigment colorant is present in an amount between 3% and 4½% based on the cellulose content of the viscose.

3. The method of manufacturing multiple filament viscose artificial silk thread defined in claim 1 in which said water-repellent pigment comprises carbon black.

4. The method of manufacturing multiple filament viscose artificial silk thread recited in claim 1 in which said water-repellent pigment comprises carbon black in an amount in the neighborhood of 4½ based on the cellulose content of the viscose.

5. An extrusion product comprising regenerated cellulose, carbon black, and a water-soluble dispersing agent, the amount of the carbon black being sufficient to impart a full black color to said extrusion product.

6. An extension product comprising regenerated cellulose, carbon black, a water-soluble dispersing agent, and an adjuvant for the carbon black, the amount of the carbon black being sufficient to impart a full black color to said extrusion product.

7. An artificial silk thread comprising regenerated cellulose, more than 2% of dispersed carbon black based on the cellulose content of the spinning solution, and a delusterant.

8. An artificial silk thread comprising regenerated cellulose, dispersed carbon black in quantity greater than 2% based on the cellulose content of the spinning solution, and a dyestuff in approximately the same proportion.

9. An artificial silk thread of regenerated cellulose in which is dispersed more than 2% of carbon black based on the cellulose content of the spinning solution.

10. An extrusion product comprising regenerated cellulose, carbon black and a dyestuff, the amount of the carbon black being sufficient to impart a full black color to said extrusion product.

EMERSON B. HELM.
ROBERT D. MacLAURIN.
JOHN B. McKELVEY.

CERTIFICATE OF CORRECTION.

Patent No. 2,233,344. February 25, 1941.

EMERSON B. HELM, ET AL.

It is hereby certified that error appears in the printed specification of the above numbered patent requiring correction as follows: Page 1, second column, line 40, for "glometate" read --glomerate--; line 55, for the word "article" read --particle--; page 2, first column, line 51, before "type" insert --of the--; page 4, first column, line 28, for "then" read --than--; same page, second column, line 54, claim 4, for "$4\frac{1}{2}$" read --$4\frac{1}{2}\%$--; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.

CERTIFICATE OF CORRECTION.

Patent No. 2,233,344. February 25, 1941.

EMERSON B. HELM, ET AL.

It is hereby certified that error appears in the printed specification of the above numbered patent requiring correction as follows: Page 4, second column, line 61, claim 6, for the word "extension" read --extrusion--; and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.